H. WULKAN.
PROCESS OF MANUFACTURING DEXTRIN.
APPLICATION FILED SEPT. 1, 1909.
993,011.
Patented May 23, 1911.
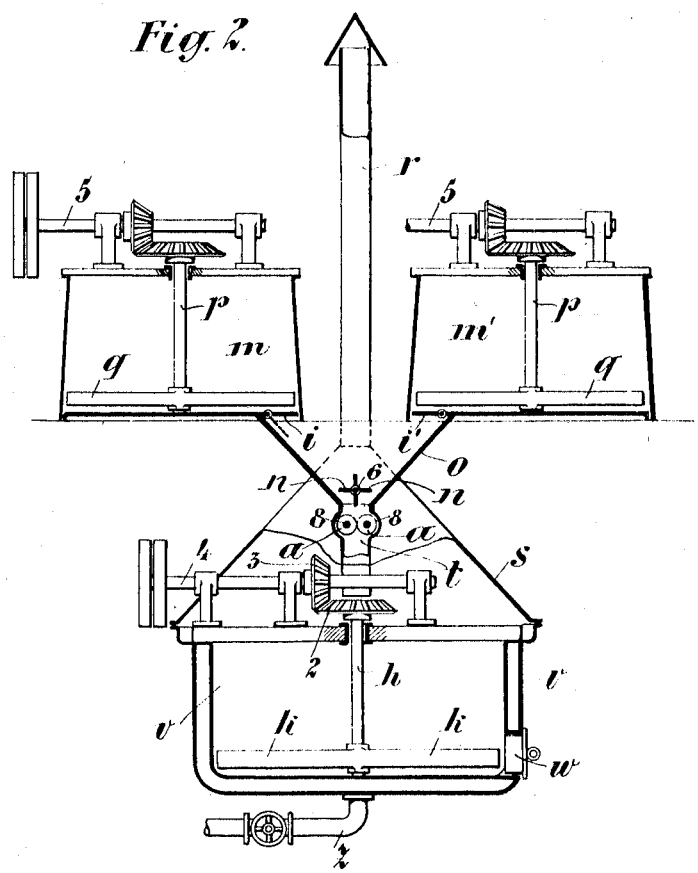
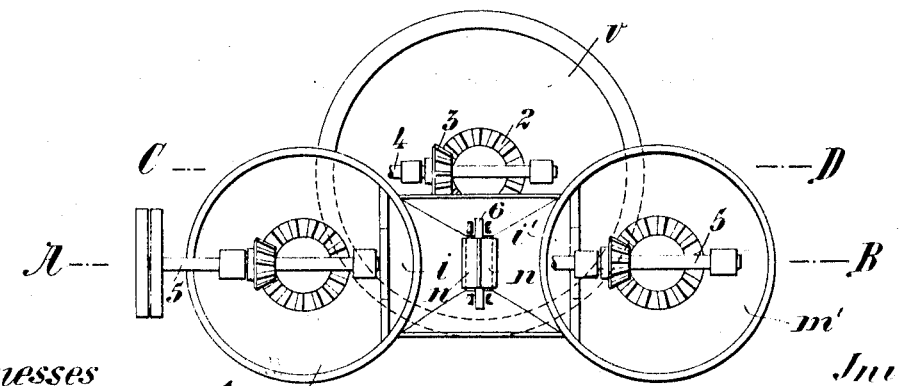

UNITED STATES PATENT OFFICE.

HEINRICH WULKAN, OF BUDAPEST, AUSTRIA-HUNGARY.

PROCESS OF MANUFACTURING DEXTRIN.

993,011.     Specification of Letters Patent.     Patented May 23, 1911.

Application filed September 1, 1909. Serial No. 515,725.

*To all whom it may concern:*

Be it known that I, HEINRICH WULKAN, citizen of the Empire of Austria-Hungary, residing at Budapest, in the Empire of Austria-Hungary, have invented certain new and useful Improvements in the Process of Manufacturing Dextrin, of which the following is a specification, reference being had therein to the accompanying drawing.

This invention has for its object to provide an improved process for the manufacture of dextrin, whereby dextrin can be produced in a continuous operation, and also whereby the produced dextrin acquires in the course of the operation the degree of moisture which dextrin produced according to existing processes acquires only during storage.

Dextrin has been produced hitherto by moistening starch with dilute acids, then drying and finally roasting the product. The dextrin produced in that manner contains very little water and is therefore extremely hygroscopic and the percentage of moisture contained in it is continually varying during storage, so that the dextrin is liable to become lumpy and otherwise deteriorate in quality. It has already been proposed to provide the dried dextrin in moistening apparatus with the percentage of water which it usually contains as a commercial article, in order that it shall have no hygroscopicity whatever, and shall retain its pulverulent condition. Attempts in that direction however have not led to a successful result.

Now the improved process which is designed to effect the above stated objects, is based on the discovery that, contrary to the usually accepted idea, dextrin is formed not only when the greater part of the water present in the starch has been eliminated therefrom but that starch containing a much greater percentage of water also becomes converted into dextrin when small quantities of acidulated starch are mixed at suitable temperatures with comparatively large quantities of starch which is in motion and in the course of dextrination. The proportion of the acidulated starch to be mixed with the starch that is to be converted into dextrin depends on the degree of dextrination which it is desired to produce. An essential condition for success in producing such a rapid and uniform dextrination is that the starch must be mixed with the acid in a perfectly intimate and uniform manner. This condition is effected in the improved process by making use of the well known fact that two pulverulent substances can be mixed together far more readily than a powder with a liquid or with a gas.

The improved process now consists in taking a small quantity (about 6 to 8 per cent.) of the powdered starch to be converted into dextrin, and first mixing this small quantity as intimately as possible with the amount of acid (from 0.2 to 0.4 per cent.) which is to be used with the whole quantity of the powdered starch, the acid being used in the highest possible degree of concentration. This mixing can be effected very easily and completely owing to the small quantities in question. As an addition of 0.2 to 0.4 per cent. of acid is sufficient for the dextrination of the whole quantity of the starch, the degree of moisture of the aforesaid small quantity of starch will be increased only to an inconsiderable extent, so that this mixture will constitute a dry powder which can be mixed readily and completely with the remainder of the starch. Any other method of acidulation for the purposes of the present invention may be employed so long as the starch is impregnated with the acid in an intimate and uniform manner.

As according to this invention it is not necessary to dry the starch that is to be converted into dextrin, the conversion into dextrin can be carried out continuously by charging the acidulated starch continuously into a heated vessel containing the starch that is in course of dextrination, while the finished dextrin containing a high percentage of water, may be withdrawn continuously from the said vessel at the same rate as fresh starch is being supplied thereto.

One form of the improved apparatus for carrying out the improved process is illustrated by way of example in the accompanying drawings in which:

Figure 1 is a plan of the apparatus; and Fig. 2 is a vertical section partly on the line A—B, and partly on the line C—D of Fig. 1.

As shown, the lower part of the apparatus comprises a double walled main mixing vessel $v$ adapted to be heated by means of a steam pipe $z$, and provided with a discharging door $w$ at the lowest point of the sides. This vessel is covered by a hood $s$ fitted with an outlet pipe $r$ and contains a vertical stirrer shaft $h$ furnished with stirring arms $k$. This shaft is driven by means of bevel wheels 2, 3 from a horizontal shaft 4. Above the main mixing vessel $v$ are two smaller mixing vessels $m$, $m^1$, which are provided likewise with vertical shafts $p$ carrying stirring arms $q$, driven from the horizontal shafts 5, 5. The bottom of each of the two vessels $m$, $m^1$ is cut away in the shape of a segment, to form a segment-shaped opening which is adapted to be closed by a door $i$, $i^1$ connecting with a funnel-shaped hopper $o$ common to both vessels $m$, $m^1$ that extends through the conical hood $s$ of the vessel $v$ and merges within this hood into a duct $t$. The commercial starch unmixed with acid is introduced into the vessel $v$ through the opening closed by the doors and through the duct $t$.

Above the place where the funnel $o$ merges into the duct $t$ there is mounted in the walls of the funnel a short shaft 6 furnished with a feeder $n$. Below this feeder there are arranged in the duct $t$ on suitable shafts 8, 8 two oppositely working rolls $a$, $a$ which are designed to break up any small lumps that may be formed in the mixing vessels $m$, $m^1$.

The starch that has been acidulated with the whole of the acid is intimately stirred and mixed with the non-acidulated starch in both vessels $m$, $m^1$. Then the mixed starch is discharged from say the vessel $m$, through the opened door $i$ into the funnel-shaped hopper $o$ while acidulated starch is being stirred with non-acidulated starch in the other vessel $m^1$, the door $i^1$ being closed. The vessel $v$ can thus be supplied continuously with acidulated starch discharged alternately from the two vessels $m$, $m^1$.

At the beginning of the operation some dextrin, or starch in the course of dextrination, is charged into the vessel $v$ or some starch is first converted into dextrin in the said vessel. The acidulated starch then falls into this previously dextrinated starch and is converted into dextrin in the manner hereinbefore described on becoming mixed with the dextrin contained in the vessel by the action of the stirring device and of the heat applied through the steam pipe $z$. According as starch is discharged from one of the vessels $m$, $m^1$ into the vessel $v$, finished dextrin can be withdrawn through the door $w$.

The degree of dextrination will be the more thorough, the longer the starch is allowed to remain in the dextrinating vessel $v$ and therefore the starch will be the more thoroughly dextrinated, the smaller the supply of acidulatel starch, that is, the smaller the quantity of dextrin which is withdrawn from the vessels $m$, $m^1$ during a unit of time. The supply is preferably regulated by the speed of the feeder $n$.

Having now particularly described and ascertained the nature of my said invention and in what manner the same is to be performed I declare that what I claim is:

1. The process for the manufacture of dextrin, which consists in intimately mixing acidulated starch with the starch to be converted into dextrin and heating the mixture with steam.

2. The process for the manufacture of dextrin consisting in bringing acidulated starch in intimate contact with commercial starch containing water in motion, heating the mixture with steam in the manner substantially as described above.

3. The process for the manufacture of dextrin consisting in bringing acidulated starch in intimate contact with starch in the course of dextrination in motion, heating the mixture with steam in the manner substantially as described above.

4. The process for the manufacture of dextrin consisting in bringing acidulated starch in intimate contact with dextrinated starch in motion, heating the mixture with steam in the manner substantially as described above.

5. The process for the manufacture of dextrin consisting in bringing acidulated starch in intimate contact with starch in motion, heating the mixture with steam withdrawing the finished dextrin continuously at the rate of the supply of the acidulated starch.

6. The process for the manufacture of dextrin consisting in bringing acidulated starch in intimate contact with commercial starch containing water in motion, heating the mixture with steam withdrawing the finished dextrin continuously at the rate of the supply of the acidulated starch.

7. The process for the manufacture of dextrin consisting in bringing acidulated starch in intimate contact with starch in the course of dextrination in motion, heating the mixture with steam withdrawing the finished dextrin continuously at the rate of the supply of the acidulated starch.

8. The process for the manufacture of dextrin consisting in bringing acidulated starch in intimate contact with dextrinated starch in motion, heating the mixture with steam withdrawing the finished dextrin continuously at the rate of the supply of the acidulated starch.

9. The improved process of acidulating starch for the manufacture of dextrin, which consists in mixing the entire quantity of the acid to be used for dextrination in the highest possible degree of concentration with a small portion of the starch which is to be converted into dextrin, and employing this mixture for acidulating the remainder of the starch.

In testimony whereof I hereunto affix my signature in presence of two witnesses.

HEINRICH WULKAN.

Witnesses:
W. J. KOUYESEN,
EMIL OESTERREICH.